O. P. OSTERGREN.
COMPOUND FUEL OIL ENGINE.
APPLICATION FILED JUNE 23, 1915.

1,233,498.

Patented July 17, 1917.
6 SHEETS—SHEET 3.

Inventor
Oscar P. Ostergren,

Witnesses.
By Joshua R. H. Potts.
His Attorney

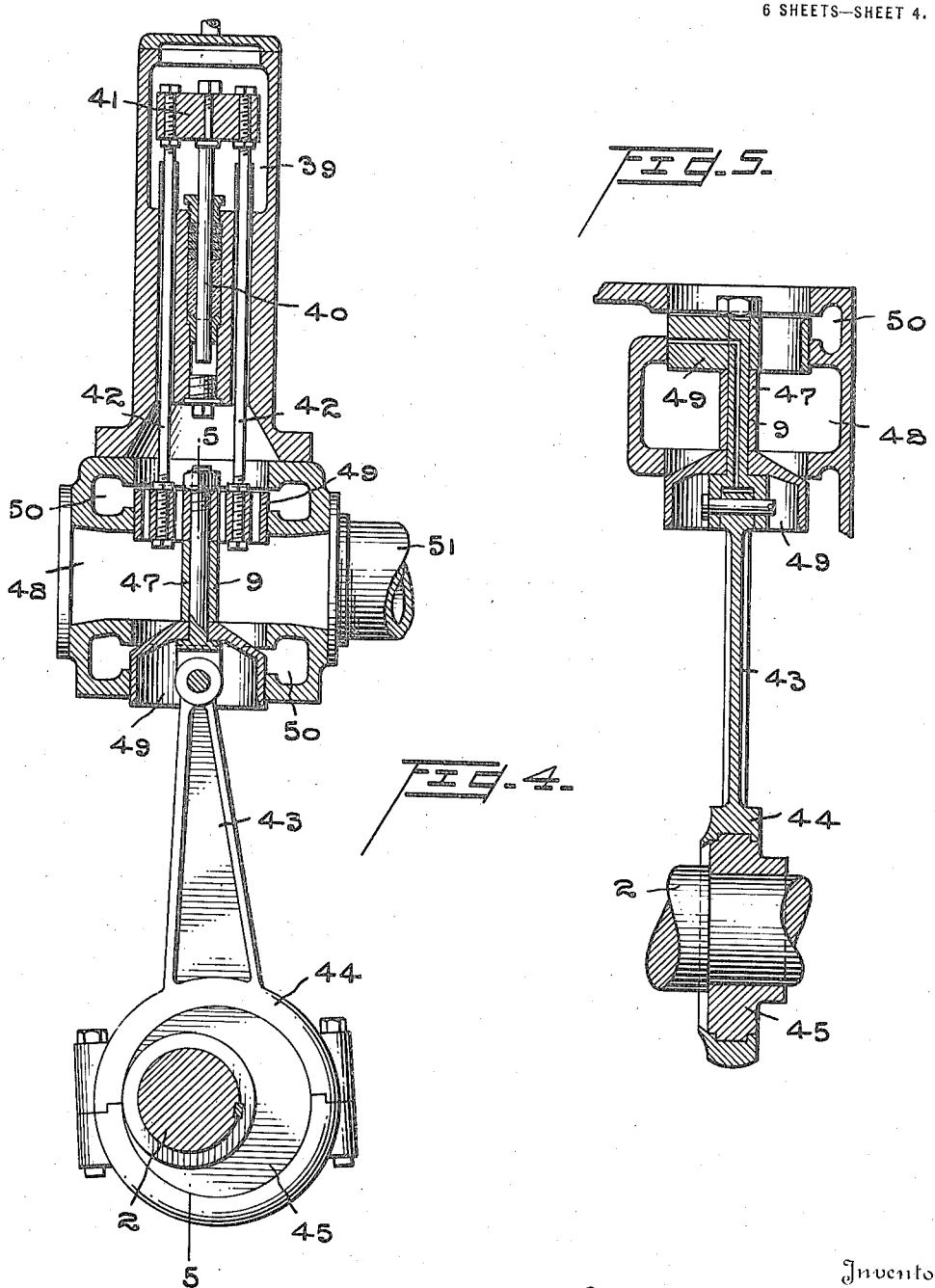

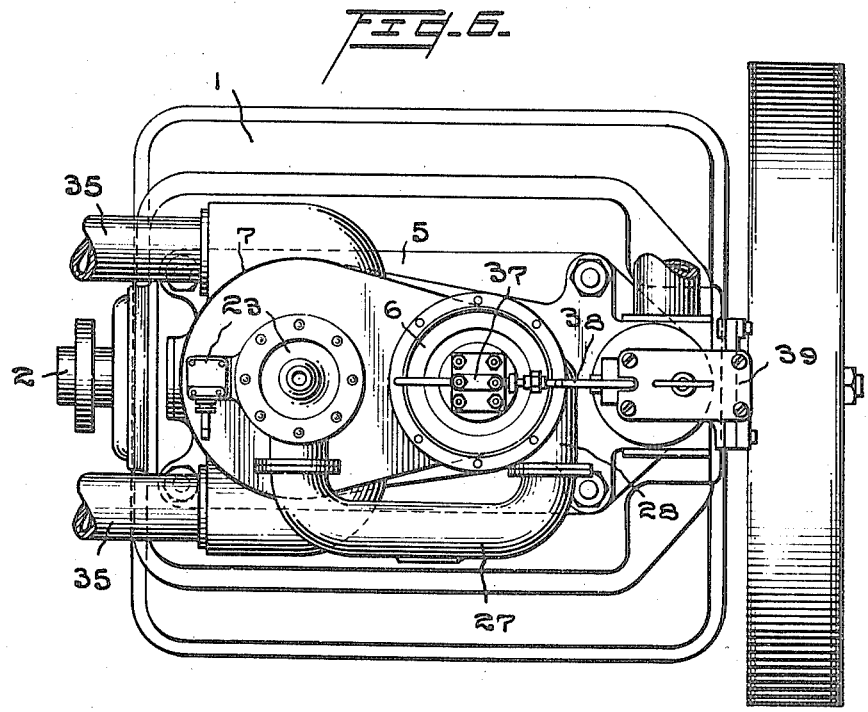
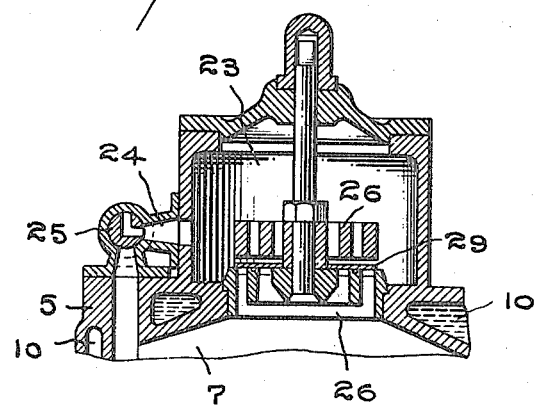

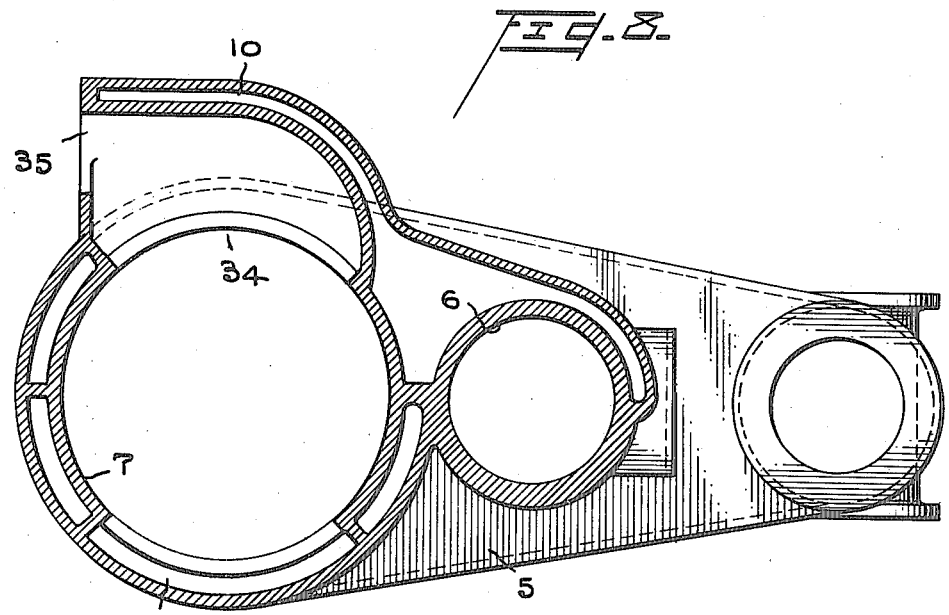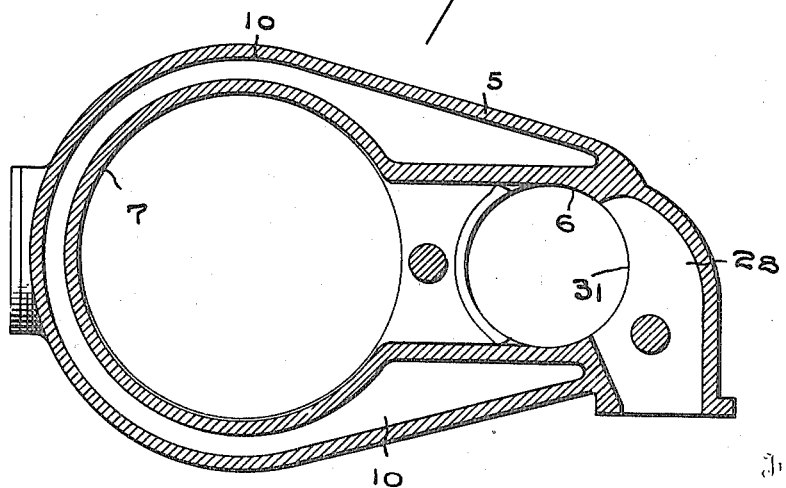

UNITED STATES PATENT OFFICE.

OSCAR P. OSTERGREN, OF BROOKLYN, NEW YORK, ASSIGNOR OF ONE-HALF TO EDWIN LUNDGREN, OF NEW YORK, N. Y.

COMPOUND FUEL-OIL ENGINE.

1,233,498.  Specification of Letters Patent.  Patented July 17, 1917.

Application filed June 23, 1915. Serial No. 35,777.

*To all whom it may concern:*

Be it known that I, OSCAR P. OSTERGREN, a citizen of the United States, residing at Brooklyn, in the county of Kings and State of New York, have invented certain new and useful Improvements in Compound Fuel-Oil Engines, of which the following is a specification.

My invention relates to improvements in compound fuel oil engines, the object of the invention being to provide an engine having a relatively small high pressure cylinder and piston coöperating with a relatively large low pressure cylinder and piston in which both pistons function as valves.

A further object is to provide a compound engine of the character stated in which the low pressure piston operates as a means for compressing air or other gas and forcing the same into the high pressure cylinder, said air operating to scavenge both cylinders and also to provide an initial compression within the high pressure cylinder before the piston in the latter begins its compression stroke.

A further object is to provide an improved compound engine of the character stated in which a relatively large volume of air and a relatively large volume of fuel oil is permitted in a relatively small cylinder, whereby an extremely high pressure is had which is utilized both in the initial combustion stage to drive the high pressure piston, and in the second auxiliary stage to drive the low pressure piston, whereby this combustion is utilized to the full and results in an engine of great power and efficiency.

With these and other objects in view, the invention consists in certain novel features of construction and combinations and arrangements of parts as will be more fully hereinafter described and pointed out in the claims.

In the accompanying drawings:

Fig. 4 is a view in vertical section on an enlarged scale on the line 4—4 of Fig. 1.

Fig. 5 is an enlarged view in section on the line 5—5 of Fig. 4.

Fig. 6 is a top plan view.

Fig. 7 is a fragmentary view in section on an enlarged scale illustrating the valve chamber above the low pressure cylinder and the by-pass valve in connection therewith.

Fig. 8 is a view in horizontal transverse section on an enlarged scale of the engine casting taken on the staggered line 8—8 of Fig. 2, all working parts being removed, and Fig. 9 is a view similar to Fig. 8 taken on the line 9—9 of Fig. 1.

Figure 2:
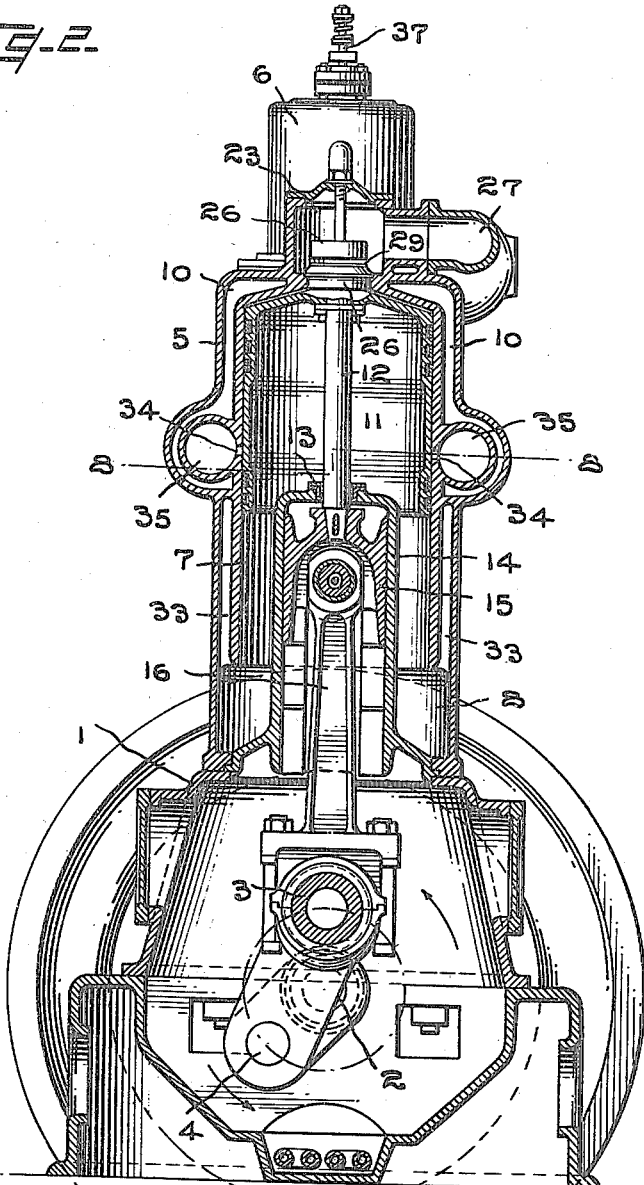
Fig. 2 is a view in vertical section on the line 2—2 of Fig. 1.
Figure 3:
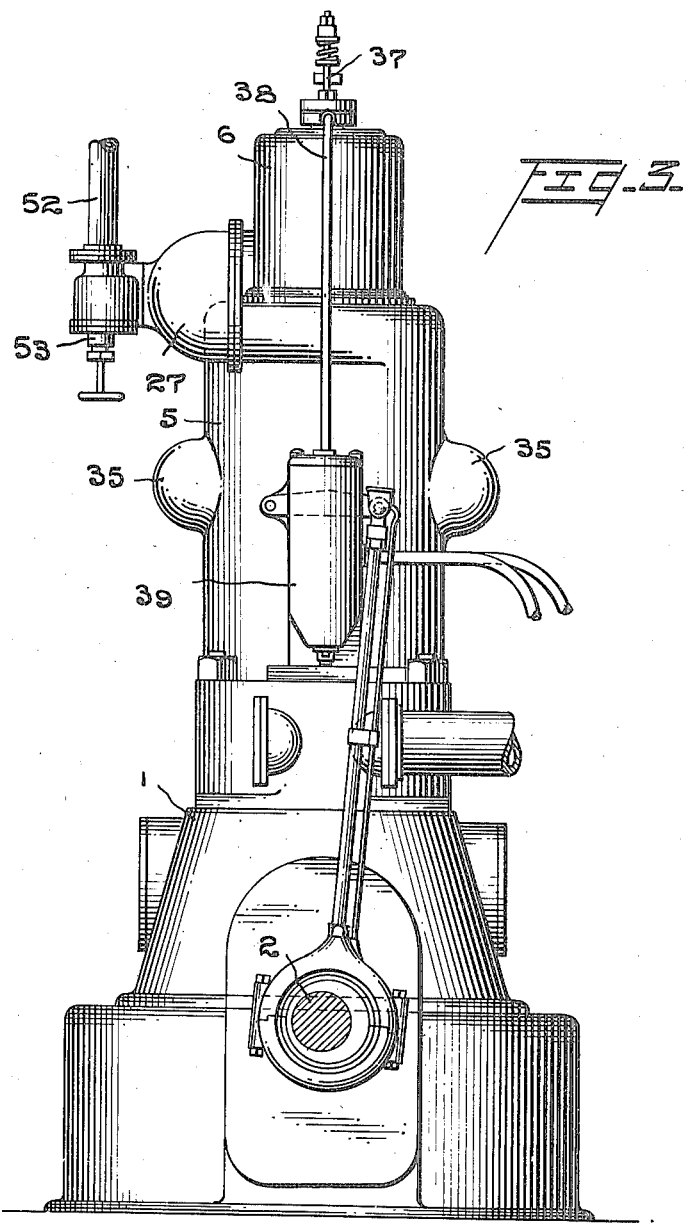
Fig. 3 is a view in side elevation of the engine showing the drive shaft in section, the section being taken on the line 3—3 of Fig. 1.

1 represents a crank case supporting a crank shaft 2, the latter provided with two crank arms 3 and 4. These crank arms are not opposite each other, but one is in advance of the other as shown clearly in Fig. 2, and the angular disposition of the cranks is important in the proper functioning of the engine.

On the crank case 2, a casting 5 is secured, and this casting is cored to form the high pressure cylinder 6, the low pressure cylinder 7 and the various chambers and passages as will be hereinafter explained.

The lower portion of the casting 7 constitutes an air chamber 8 communicating directly with the lower end of low pressure cylinder 7, and the admission of air to this chamber 8 is controlled by a valve 9 to be hereinafter described.

The cylinders are both water jacketed as shown at 10, and it is to be understood that all the wearing parts will be lubricated in any approved manner, preferably by the form of pressure mechanism which is common in this art.

11 represents the low pressure piston which is hollow, and at its lower end is open. A piston rod 12 is disposed centrally in the low pressure piston 11 and moves through a packing gland 13 in the upper end of a guide casing 14. The casing 14 is located concentrically within the low pressure cylinder, is in open communication at its lower end with the crank case, and constitutes a guide for a cross head 15 with which the rod 12 is connected, and said cross head is connected by a pitman 16 with the crank 3.

17 represents the low pressure piston which is connected by a rod 18 with the cross head 19, the latter guided in a casing 20 which is in open communication with the crank case 2, and provides a guide for the cross head 19 with which rod 18 is connected.

A pitman 22 connects the cross head 19 with the crank 4. On top of the low pressure cylinder 7, a valve chamber 23 is provided, and is connected by a by-pass passage 24 with the cylinder 11, this by-pass passage being normally closed by a valve 25 which may be manually operated at any time desired.

In the valve chamber 23, a disk valve 29 is supported between perforated plates 26 and operates as a check valve to control communication between cylinder 7 and valve chamber 23. The valve chamber is connected by a passage 27 with an air chamber 28 extending partially around the high pressure cylinder 6, and on the side of said cylinder farthest removed from the low pressure cylinder.

The valve chamber 23, passage 27, and chamber 28 constitute an air reservoir in which air is compressed and stored, and for convenience of description hereinafter, these three coöperating parts will be referred to as an "air reservoir".

A port 30 connects cylinders 6 and 7, and is located in a slightly higher plane than the port 31, connecting the chamber 28 of the air reservoir above referred to with the high pressure cylinder, and in order to deflect the air upwardly in the high pressure cylinder, the end of piston 17 has an enlargement 32 thereon.

Figure 1:
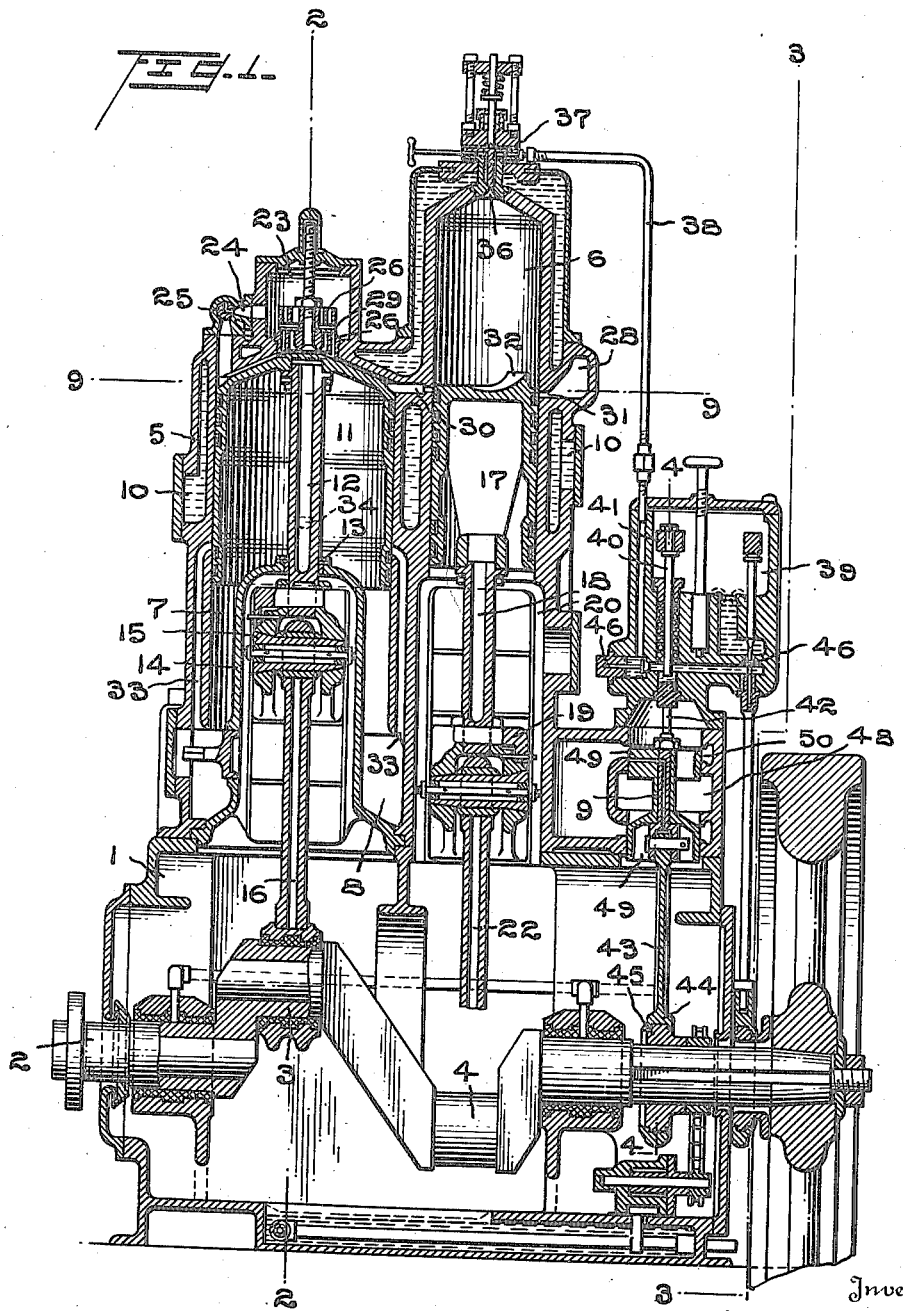
Figure 1 is a view in longitudinal section illustrating my improved compound fuel oil engine.

The lower end of low pressure cylinder 7, which constitutes an air chamber, is provided in its opposite walls with air passages 33 connecting the lower air chamber 8 with the intermediate portion of the low pressure cylinder, these passages being shown in longitudinal section in Fig. 1.

Exhaust ports 34 communicate with opposite sides of the low pressure cylinder, and are located in a higher plane than are the upper ends of air passages 33, so that the low pressure piston 11 on its downward stroke first opens the exhaust ports 34 and afterward the passages 33.

The ports 34 communicate with exhaust pipes 35 which are of a sufficient diameter to carry off the waste gases without resistance.

In the upper end of the high pressure cylinder 6, a relatively small orifice 36 is provided for the fuel oil, and a spring-pressed valve 37 offers resistance to the entrance of the oil into the cylinder. 38 is an oil supply pipe which communicates with an oil reservoir 39 having an oil ejecting plunger 40 therein. This plunger 40 is connected to a cross bar 41 in the upper portion of the oil reservoir, and the latter is connected by rods 42 with the upper end of my improved air valve 9.

The air valve 9 is connected by a link 43 with an eccentric strap 44, the latter mounted on an eccentric 45 on shaft 2, so that the plunger and air valve operate together, and by the same means. This invention is not limited to the particular manner of discharging the oil, but I have shown an arrangement of check valves 46 which compel the proper feed of oil and insure a uniform quantity at each operation of the plunger, and it is to be understood that I may employ various means for insuring a proper proportion of fuel under pressure at the right time.

The air valve 9 above referred to comprises an intermediate relatively narrow stem 47 which is movable through an air chamber 48, and has valve heads 49 at its respective ends which are adapted to close passages 50.

The chamber 48 in its top and bottom has direct communication with the chamber 8, and the valve 49 controls both of these openings which connect the two chambers. As shown clearly in Fig. 2, the chamber 8 extends around the outside of the cross head guide for pitman 16, so that there is a direct communication of the air chamber 48.

The air chamber 48 communicates with an air supply pipe 51, and the air from the chamber 48 flows in both directions from the chamber 48 into the air chamber 8, through the passages 50 as shown clearly in Figs. 1 and 4.

52 represents a supply pipe which may direct air or other fluid from any desired source into passage 27 which constitutes a part of the air reservoir to start the engine, and this pipe 52 is normally closed by a valve 53.

The operation of my improved engine is as follows:

To start, air under compression will be admitted to passage 27 from pipe 52 by opening valve 53. The air reservoir which consists of the passage 27 with valve chamber 23 and air chamber 28 will receive the necessary air under pressure, and after the shaft 2 has been turned to move high pressure piston 17 slightly below the position shown in Fig. 1, the compressed air will enter port 31, fill high pressure cylinder 6, then pass through port 30, and force low pressure piston 11 downwardly.

It is to be understood that the air can not enter the cylinders until port 31 is uncovered, and when the parts are in such position, the low pressure piston 11 will be over its dead center for positive starting. It is for this reason desirable to bring the pistons to starting position by turning the shafts as above described.

In order to overcome any resistance to the movement of the pistons, the by-pass valve 25 may be turned to open the by-pass 24, connecting valve chamber 23 with the low pressure cylinder 7. When the piston 11 descends, the air in the lower portion of cylinder 7 is compressed for scavenging the cylinder 7. As the piston 11 moves downwardly, it first opens exhaust ports 34, permitting an exhaust of the hot gases from the previous charge. Later, the piston uncovers the upper ends of passages 33, so that the compressed air from below the piston is discharged into the upper end of the cylinder 7 to force out the hot gases, and thoroughly scavenge the cylinder.

On the up stroke of piston 11, the passages 33 are first closed and then ports 34 are closed, so that the air in the upper end of cylinder 7 is trapped and a continued upward movement of the piston 11 forces this air past valve 29 into the air reservoir, and it will be noted that as practically all of the air is expelled from the upper end of cylinder 7, there will be but very small clearance between the end of the piston and the end of the cylinder.

When the piston 11 is passing over its upper dead center, the high pressure cylinder 17 begins to open port 30 as shown in Fig. 1. This condition is due to the predetermined relation of angle between the cranks 3 and 4 as above explained, and it will be evident that the high pressure piston 17 is now acting as a valve for the low pressure engine very much after the manner of a steam engine.

The charge in the high pressure cylinder 6, while so far explained possess as yet a considerable pressure (approximately eight atmospheres) and temperatures, but as port 30 is uncovered and the low pressure piston 11 descends, the said gas will continue to expand until port 30 is again closed. At that point, the low pressure piston 11 is about one-third down on its downward stroke. From this point on, the gases are expanded in the low pressure cylinder alone until the end of stroke of the said low pressure piston when scavenging takes place as before mentioned.

Before port 30 is fully opened, port 31 begins to open, as it is to be understood that the piston 17 moves slightly below the position shown in Fig. 1, and the compressed air in the chamber 28 thoroughly scavenges the high pressure cylinder 6. If, at this juncture, the air in the air reservoir with which chamber 28 forms a part is of higher pressure than that within both cylinders above the pistons, the scavenge will take place and the air pressure in the cylinders will drop due to the rapidly descending low pressure piston until port 31 is closed by the high pressure piston 17 as the latter ascends.

It is important to proportion the volume of the air reservoir comprising valve chamber 23, passage 27, and air chamber 28, so that the volume of air contained therein is sufficient so that each charge of air forced into the same by the low pressure piston shall acquire a pressure not less than the pressure of the high pressure charge at the time when port 31 begins to open.

The residuary pressure in the air reservoir when port 31 closes depends upon the combined volume of high pressure and low pressure cylinders above the pistons at this point, and also depends on the temperature of the high pressure charge.

As port 30 is closed by the upward movement of the high pressure piston, the fresh air within the high pressure cylinder will have a pressure considerably higher than one atmosphere (about four atmospheres or more). This air is of course heated by previous compression, and by contact with the hot gases and hot cylinder while more heat is added by further compression in the high pressure stage, until ignition temperature for the fuel is reached.

Having, however, started with approximately four times more air in the cylinder than possible with engines of this type heretofore known, the high pressure piston arrives at the end of compression with approximately four times greater volume than heretofore possible. That is to say, the cylinder clearance in the high pressure cylinder will be appreciably greater than in other types of engine, and while the pressure and temperature will be equally as high, the volume of air will be very much greater.

This, of course, means that a greater quantity of fuel oil should be used than heretofore, and as the charge will be expanded to the original volume, that is to the low pressure cylinder displacement, an appreciably greater power will be the result. This results in a great reduction of weight, size and cost, and evenly distributes the pressure on two nearly opposed cranks, while the fuel pump is reduced of a single large unit.

When the high pressure piston 17 reaches the end of its stroke and passes the upper dead center, the fuel oil will be discharged in a spray past the valve 36 through the small orifice 37, and will be ignited and combustion take place forcing the high pressure piston downwardly when the operation above described will be repeated.

It will thus be noted that the air compressed by the low pressure piston performs the function of scavenging both cylinders and also gives an initial pressure to the air in the high pressure cylinder.

It will be noted that with my improved engine, I utilize a relatively large volume of air with a relatively large volume of fuel in a relatively small cylinder, and this is important in regard to the injection and atomizing of the fuel. This is accomplished by the resistance of the valve 39 and the relatively small orifice 36 combined with the pressure of the fuel, and the advantage is thermal as well as structural.

Furthermore, the spraying or atomizing of the liquid fuel produces a better and more uniform combustion, and results in a higher power than possible with engines of the ordinary type.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a compound fuel oil engine, the combination with high and low pressure cylinders, said high pressure cylinder having an inlet port in one side and a single exhaust port in the other side communicating with the low pressure cylinder, pistons in said cylinders, and said high pressure piston operating as a valve to cut off both of said ports and constitute the sole controlling means for the inlet of air thereto and exhaust of gas therefrom, an air passage connecting the working end of the low pressure cylinder with the inlet port of the high pressure cylinder, whereby the low pressure piston operates to force air under pressure into the high pressure cylinder, substantially as described.

2. In a compound fuel oil engine, the combination with high and low pressure cylinders, said high pressure cylinder having an inlet port in one side and a single exhaust port in the other side communicating with the low pressure cylinder, pistons in said cylinders, and said high pressure piston operating as a valve to cut off both of said ports and constitute the sole controlling means for the inlet of air thereto and the exhaust of gas therefrom, an air reservoir in direct communication with both cylinders, an air passage connecting the working end of the low pressure cylinder with the inlet port of the high pressure cylinder, whereby the low pressure piston operates to force air under pressure into the high pressure cylinder, substantially as described.

3. In a compound fuel oil engine, the combination with high and low pressure cylinders located side by side and having a single port connecting them, constituting the sole exhaust from the high pressure cylinder to the low pressure cylinder, of pistons in the cylinders, the piston in the high pressure cylinder controlling the opening and closing of said port, means permitting the compression of air in the working end of the low pressure cylinder and the discharge of the same into the high pressure cylinder, through a port slightly below the first-mentioned port, substantially as described.

4. In a compound fuel oil engine, the combination with high and low pressure cylinders located side by side and having a single port connecting them and constituting the sole exhaust from the high pressure cylinder to the low pressure cylinder, of pistons in said cylinders, the piston in the high pressure cylinder controlling the opening and closing of said port, means permitting the compression of air in the working end of the low pressure cylinder and the discharge of the same into the high pressure cylinder, said means including a port in said low pressure cylinder uncovered at the end of the power stroke, there being a passageway extending from the lower end of said cylinder and communicating with the last mentioned port, said high pressure piston controlling the inlet of air to the high pressure cylinder, means for admitting air to the low pressure cylinder below the piston therein, and means for forcing liquid fuel into the end of the high pressure cylinder, substantially as described.

5. In a compound fuel oil engine, the combination with high and low pressure cylinders located side by side and having a single port connecting them and constituting the sole exhaust from the high pressure cylinder to the low pressure cylinder, the piston in the high pressure cylinder controlling the opening and closing of said port, means permitting the compression of air in the working end of the low pressure cylinder and the discharge of the same into the high pressure cylinder through a port at the opposite side of and slightly below the first mentioned port, said means including a port in the low pressure cylinder uncovered at the end of the power stroke, there being a passageway extending from the lower end of said cylinder and communicating with the last mentioned port, means for admitting air to the low pressure cylinder below the piston therein and means for forcing liquid fuel into the end of the high pressure cylinder, substantially as described.

6. In a compound fuel oil engine, the combination with high and low pressure cylinders located side by side having a port connecting the intermediate portion of the high pressure cylinder with the end of the low pressure cylinder and constituting the sole exhaust from the high pressure cylinder into the low pressure cylinder, and pistons in the cylinders, the piston in the high pressure cylinder constituting the sole controlling means for the admission of air thereto and the exhaust of gas therefrom, the low pressure cylinder being appreciably larger than the high pressure cylinder, of an air reservoir in communication with the upper end of the low pressure cylinder and with a port in the side of the high pressure cylinder, and said low pressure cylinder having an air chamber below the piston, and a port uncovered by said low pressure piston at the end of its power stroke, there being a passage way extending from said chamber to said port whereby said low pressure piston operates to compress the air, force the same from said chamber to scavenge the low pressure cylinder and then force the scavenging air entrapped therein into the air reservoir, and utilize said air to automatically scavenge the high pressure cylinder, substantially as described.

7. In a compound fuel oil engine, the combination with high and low pressure cylinders located side by side and having a single port connecting them, constituting the sole exhaust from the high pressure cylinder to the low pressure cylinder, of pistons in the respective cylinders, an air reservoir connecting the upper end of the low pressure cylinder with a port in the side of the high pressure cylinder, an air chamber below the piston in the low pressure cylinder, said low pressure cylinder having passages connecting the air chamber with the intermediate portion of the high pressure cylinder, exhaust ports in the low pressure cylinder above the upper ends of said passages, and a positively operated air valve controlling the admission of air to said air chamber, substantially as described.

8. In a compound fuel oil engine, the combination with high and low pressure cylinders located side by side and having a port connecting them, of pistons in the respective cylinders, an air reservoir connecting the upper end of the low pressure cylinder with a port in the side of the high pressure cylinder, an air chamber below the piston in the low pressure cylinder, said low pressure cylinder having passages connecting the air chamber with the intermediate portion of the high pressure cylinder, exhaust ports in the low pressure cylinder above the upper ends of said passages, means for spraying a pre-determined quantity of fuel oil into the end of the high pressure cylinder, substantially as described.

9. In a compound fuel oil engine, the combination with high and low pressure cylinders located side by side and having a port connecting them, of pistons in the respective cylinders, an air reservoir connecting the upper end of the low pressure cylinder with a port in the side of the high pressure cylinder, an air chamber below the piston in the low pressure cylinder, said low pressure cylinder having passages connecting the air chamber with the intermediate portion of the high pressure cylinder, exhaust ports in the low pressure cylinder above the upper ends of said passages, means for spraying a pre-determined quantity of fuel oil into the end of the high pressure cylinder, and a valve positively operated in conjunction with the oil feeding mechanism to open and close the inlet to said air chamber, substantially as described.

10. In a compound fuel oil engine, the high and low pressure cylinders and their respective pistons, and means whereby warm air compressed by the low pressure piston is injected into the high pressure cylinder to scavenge the same and said high pressure piston being timed to entrap the warm compressed air at the beginning of the return stroke, substantially as described.

11. In an internal combustion engine wherein the charge is ignited by the heat of compression, means whereby the cylinder is scavenged at the end of the working stroke by warm air under pressure and the scavenging air entrapped at the beginning of the return stroke with the initial pressure of several atmospheres, substantially as described.

12. In an internal combustion engine wherein the charge is ignited by the heat of compression, the working cylinder and piston, said cylinder being provided with air inlet and exhaust ports controlled solely by said piston and means whereby the cylinder is scavenged at the end of the working stroke by warm air under pressure and the scavenging air entrapped at the beginning of the return stroke with appreciable initial pressure, substantially as described.

13. In a compound fuel oil engine wherein the charge is ignited in the high pressure cylinder by the heat of compression, the high and low pressure cylinders provided with inlet and exhaust ports and equipped with the working pistons constituting the sole means of controlling said ports, means whereby air is compressed by the low pressure piston and injected into said cylinders at the end of the working stroke of both pistons to scavenge the same and said high pressure piston being timed to entrap said scavenging air at the beginning of the return stroke of said piston with the air at an appreciable initial pressure, substantially as described.

14. In a compound fuel oil engine, the high pressure and low pressure cylinders and their respective pistons in combination with an exhaust passage for the high pressure cylinder leading from the lower portion of the high pressure cylinder to the upper portion of the low pressure cylinder and adapted to be uncovered by the high pressure piston as it approaches the end of its working stroke, an air reservoir, a port forming a communication between said reservoir and said high pressure cylinder, said port being arranged below said exhaust port and adapted to be uncovered by the high pressure piston at substantially the end of its working stroke, the air in said reservoir being compressed by the return stroke of the low pressure piston, said low pressure cylinder being provided with an exhaust port adapted to be uncovered by the low pressure piston as it approaches the end of the working stroke, an air chamber in which air is compressed by the working stroke of the low pressure cylinder and a port leading from said chamber into said low pressure cylinder below said exhaust port and adapted to be uncovered by said low pressure piston at substantially the end of its stroke, substantially as described.

In testimony whereof I have signed my name to this specification in the presence of two subscribing witnesses.

OSCAR P. OSTERGREN.

Witnesses:
EUGENE EBLE,
GERTRUDE A. VANDERBECK.